US010171795B2

(12) United States Patent
Park et al.

(10) Patent No.: US 10,171,795 B2
(45) Date of Patent: Jan. 1, 2019

(54) SYSTEM AND METHOD FOR GENERATING DISPARITY MAP BY MATCHING STEREO IMAGES

(71) Applicants: Hyundai Motor Company, Seoul (KR); Kia Motors Corporation, Seoul (KR); Kyungpook National University Industry-Academic Cooperation Foundation, Daegu (KR)

(72) Inventors: Min Woo Park, Gyeonggi-do (KR); Won Seok Lee, Gyeonggi-do (KR); Jung Pil Park, Gyeongsangnam-do (KR); Geun Ho Jeong, Daegu (KR); Soon Ki Jung, Daegu (KR)

(73) Assignees: Hyundai Motor Company, Seoul (KR); Kia Motors Corporation, Seoul (KR); Kyungpook National University Industry-Academic Cooperation Foundation, Daegu (KR)

( * ) Notice: Subject to any disclaimer, the term of this patent is extended or adjusted under 35 U.S.C. 154(b) by 286 days.

(21) Appl. No.: 15/353,430

(22) Filed: Nov. 16, 2016

(65) Prior Publication Data
US 2018/0054609 A1 Feb. 22, 2018

(30) Foreign Application Priority Data
Aug. 22, 2016 (KR) .................. 10-2016-0106266

(51) Int. Cl.
*G06K 9/00* (2006.01)
*H04N 13/239* (2018.01)
(Continued)

(52) U.S. Cl.
CPC ......... *H04N 13/271* (2018.05); *H04N 13/239* (2018.05); *H04N 2013/0081* (2013.01)

(58) Field of Classification Search
CPC ............... H04N 13/271; H04N 13/239; H04N 2013/0081
See application file for complete search history.

(56) References Cited

U.S. PATENT DOCUMENTS 9,269,153 B2 * 2/2016 Gandolph ............... G06T 7/215
2002/0025075 A1 * 2/2002 Jeong ...................... G06K 9/32
382/217
(Continued)

FOREIGN PATENT DOCUMENTS

JP 2012-181142 A 9/2012
JP 2013-206468 A 10/2013
(Continued)

OTHER PUBLICATIONS

Kwang Hee Won, Joonwoo Son and Soon Ki Jung, "Stixels Estimation through Stereo Matching of Road Scenes", Proceeding of the 2014 Research in Adaptive and Convergent Systems, pp. 116-120, Oct. 5-8, 2014, Towson, MD, USA.
(Continued)

*Primary Examiner* — Wesley J Tucker
(74) *Attorney, Agent, or Firm* — Mintz Levin Cohn Ferris Glovsky and Popeo, P.C.; Peter F. Corless

(57) ABSTRACT

A system for generating a disparity map includes: an image obtainer obtaining a left image and a right image; a matching cost calculator calculating a matching cost for each of a plurality of pixels of the left image and the right image; an accumulation and summation calculator calculating an accumulation value of one of the pixels based on the calculated matching cost, and calculating a relaxation accumulation value, which is an average of values obtained by multiplying each of relation coefficients between a disparity value of the one pixel and disparity values of surrounding pixels of the one pixel with the accumulation value of the one pixel; a disparity value deliver deriving a disparity value for each of
(Continued)

the pixels based on the calculated relaxation accumulation value; and a disparity map generator generating the disparity map based on the derived disparity value.

13 Claims, 20 Drawing Sheets

(51) Int. Cl.
*H04N 13/271* (2018.01)
*H04N 13/00* (2018.01)

(56) References Cited

U.S. PATENT DOCUMENTS

| | | | | |
|---|---|---|---|---|
| 2015/0296202 | A1* | 10/2015 | Zhong | G06K 9/6202 |
| | | | | 348/47 |
| 2016/0150210 | A1* | 5/2016 | Chang | G06T 7/593 |
| | | | | 382/154 |
| 2017/0163960 | A1* | 6/2017 | Nagata | H04N 13/128 |
| 2018/0020205 | A1* | 1/2018 | Aflalo | H04N 13/133 |

FOREIGN PATENT DOCUMENTS

| | | |
|---|---|---|
| KR | 10-0938195 B1 | 1/2010 |
| KR | 2015-0053438 A | 5/2015 |

OTHER PUBLICATIONS

K.H. Won and S.K. Jung, "Billboard sweep stereo for obstacle detection in road scenes", Electronics Letters, vol. 48 No. 24, pp. 1528-1530, Nov. 22, 2012.

\* cited by examiner

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

FIG.5A

| 1 |  |  |  |  |
|---|---|---|---|---|
| 1 |  |  |  |  |
| 1 |  |  |  |  |
| 1 |  |  |  |  |
| 1 |  |  |  |  |

| 13 | 15 | 11 | 10 | 9 |
|----|----|----|----|---|
| 15 | 14 | 9  | 7  | 8 |
| 12 | 17 | 16 | 15 | 14|
| 13 | 18 | 8  | 10 | 11|
| 11 | 19 | 7  | 6  | 8 |

FIG.6A

|   |    |    |    |   |
|---|----|----|----|---|
|   | 14 | 9  | 7  |   |
|   | 17 | 16 | 15 |   |
|   | 18 | 8  | 10 |   |
|   |    |    |    |   |

FIG.6B

|    |    |    |    |    |
|----|----|----|----|----|
|    | 14 | 9  | 7  |    |
|    | 17 | 8  | 15 |    |
|    | 12 | 8  | 10 |    |
|    |    |    |    |    |

|   |   |   |   |   |
|---|---|---|---|---|
|   | 14 | 9 | 7 |   |
|   | 17 | 3 | 15 |   |
|   | 12 | 8 | 10 |   |
|   |   |   |   |   | d = 9

FIG. 7C

<RELATED ART>

SYSTEM AND METHOD FOR GENERATING DISPARITY MAP BY MATCHING STEREO IMAGES

CROSS-REFERENCE TO RELATED APPLICATION

This application claims under 35 U.S.C. § 119(a) the benefit of Korean Patent Application No. 10-2016-0106266, filed on Aug. 22, 2016 in the Korean Intellectual Property Office, the entire contents of which are incorporated by reference herein.

BACKGROUND

(a) Technical Field

The present disclosure relates to a system and method for generating a disparity map by matching stereo images.

(b) Description of the Related Art

A technology of matching stereo images is widely used to recognize situations around a vehicle, including a detection of objects (e.g., a vehicle, a pedestrian, etc.) based on three-dimensional (3D) information, calculation of a drivable area, and the like. In order to utilize the technology of matching stereo images in a vehicle environment, high reliability for the matching result of stereo images is required Since an algorithm of matching stereo images based on a global matching may calculate the 3D information having high quality, but has high calculation complexity, an algorithm of matching stereo images based on local matching that requires low calculation costs is applied to the vehicle environment. However, the local matching method has a disadvantage that it may not perform an accurate and dense matching for a wide area such as a road surface.

Recently, research has been performed based on a semi-global matching method which is of high quality compared to calculation cost However, the semi-global matching method which is conventionally used assumes a 3D geometry element which is not suitable for the vehicle environment. Thereby, there is a problem that a degradation in performance occurs in matching quality and calculation cost. In particular, it is difficult to match a surface which is significantly inclined with respect to an image plane of a camera such as the road surface, and it is difficult to properly perform a stereo matching in bad weather conditions such as rain and snow which often occur at the time of driving of the vehicle.

Therefore, it is required to develop a system and method capable of generating an excellent disparity map by matching the stereo images even in bad weather conditions.

SUMMARY

An aspect of the present disclosure provides a method for generating a disparity map capable of performing matching of stereo images even in bad weather conditions.

According to an exemplary embodiment of the present disclosure, a system for generating a disparity map includes: an image obtainer obtaining a left image and a right image; a matching cost calculator calculating a matching cost for each of a plurality of pixels of the left image and the right image; an accumulation and summation calculator calculating an accumulation value of one of the pixels based on the calculated matching cost, and calculating a relaxation accumulation value, which is an average of values obtained by multiplying each of relation coefficients between a disparity value of the one pixel and disparity values of surrounding pixels of the one pixel with the accumulation value of the one pixel; a disparity value deriver deriving a disparity value for each of the pixels based on the calculated relaxation accumulation value; and a disparity map generator generating the disparity map based on the derived disparity value.

The matching cost calculator may calculate the matching cost by comparing ground images of the left image and the right image, and calculate the matching cost by comparing images over a ground of the left image and the right image.

When the accumulation and summation calculator accumulates and sums the matching cost in a vertical direction, the accumulation and summation calculator may calculate a current accumulation value by summing a minimum value among an accumulation value of a previous direction of the corresponding disparity, a value obtained by summing a first accumulation constant to an accumulation value of a direction around a disparity value, and a value obtained by summing a second accumulation constant to a minimum value of the accumulation values of the previous direction to current matching cost, and when the accumulation and summation calculator accumulates and sums the matching cost in a horizontal direction, the accumulation and summation calculator may calculate the current accumulation value by summing a minimum value among the accumulation value of the previous direction of the corresponding disparity and the value obtained by summing the second accumulation constant to the minimum value of the accumulation values of the previous direction to the current matching cost The accumulation and summation calculator may calculate a repeated relaxation accumulation value, which is an average of values obtained by multiplying each of the relation coefficients between the disparity value of the one pixel and the disparity values of the surrounding pixels of the one pixel with the relaxation accumulation value of the one pixel, and the disparity value deriver may derive the disparity value for each of the pixels based on the repeated relaxation accumulation value.

The disparity value deliver may derive a disparity value that the calculated accumulation value becomes a minimum, as the disparity value of the one pixel.

The system may further include a stixel applier grouping pixels having the same disparity value in a vertical direction or a horizontal direction to configure a stixel, and changing disparity values of pixels located between a plurality of stixels to disparity values of the plurality of stixels when a pixel distance between the plurality of stixels which are configured in the same direction to be located on the same line and have the same disparity value is a preset pixel value or less.

According to another exemplary embodiment of the present disclosure, a method for generating a disparity map includes: obtaining a left image and a right image; calculating a matching cost for each of a plurality of pixels of the left image and the right image; calculating an accumulation value of one of the pixels based on the calculated matching cost; calculating a relaxation accumulation value, which is an average of values obtained by multiplying each of relation coefficients between a disparity value of the one pixel and disparity values of surrounding pixels of the one pixel with the accumulation value of the one pixel; deriving a disparity value for each of pixels based on the calculated relaxation accumulation value; and generating the disparity map based on the derived disparity value.

In the calculating of the matching cost, the matching cost may be calculated by comparing ground images of the left image and the right image, and the matching cost may be calculated by comparing images over a ground of the left image and the right image.

In the calculating of the accumulation value, when the matching cost is accumulated and summed in a vertical direction, a current accumulation value may be calculated by summing a minimum value among an accumulation value of a previous direction of the corresponding disparity, a value obtained by summing a fast accumulation constant to an accumulation value of a direction around a disparity value, and a value obtained by summing a second accumulation constant to a minimum value of the accumulation values of the previous direction to current matching cost, and when the matching cost is accumulated and summed in a horizontal direction, the current accumulation value may be calculated by summing a minimum value among the accumulation value of the previous direction of the corresponding disparity and the value obtained by summing the second accumulation constant to the minimum value of the accumulation values of the previous direction to the current matching cost The method may further include: after the calculating of the relaxation accumulation value, calculating a repeated relaxation accumulation value, which is an average of values obtained by multiplying each of the relation coefficients between the disparity value of the one pixel and the disparity values of the surrounding pixels of the one pixel with the relaxation accumulation value of the one pixel, wherein in the deriving of the disparity value for each of the pixels, the disparity value for each of the pixels is derived based on the repeated relaxation accumulation value.

In the deriving of the disparity value for each of the pixels, a disparity value that the calculated accumulation value becomes a minimum may be derived as the disparity value of the one pixel.

The method may further include: grouping pixels having the same disparity value in a vertical direction or a horizontal direction to configure a stixel, and changing disparity values of pixels located between a plurality of stixels to disparity values of the plurality of stixels when a pixel distance between the plurality of stixels which are configured in the same direction to be located on the same line and have the same disparity value is a preset pixel value or less.

A non-transitory computer readable medium containing program instructions executed by a processor can include: program instructions that obtain a left image and a right image; program instructions that calculate a matching cost for each of a plurality of pixels of the left image and the right image; program instructions that calculate an accumulation value of one of the pixels based on the calculated matching cost; program instructions that calculate a relaxation accumulation value, which is an average of values obtained by multiplying each of relation coefficients between a disparity value of the one pixel and disparity values of surrounding pixels of the one pixel with the accumulation value of the one pixel; program instructions that derive a disparity value for each of pixels based on the calculated relaxation accumulation value; and program instructions that generate a disparity map based on the derived disparity value.

BRIEF DESCRIPTION OF THE DRAWINGS

The above and other objects, features and advantages of the present disclosure will be more apparent from the following detailed description taken in conjunction with the accompanying drawings.

FIG. 5A is a matching cost map illustrating matching cost for each of pixels according to an exemplary embodiment of the present disclosure.

FIG. 5B is an accumulation value map illustrating an accumulation value for each of pixels in the case in which the accumulation and summation are performed once from a left direction to a right direction according to an exemplary embodiment of the present disclosure.

FIG. 5C is an accumulation value map illustrating an accumulation value for each of pixels in the case in which the accumulation and summation are performed twice from a left direction to a right direction according to an exemplary embodiment of the present disclosure.

FIG. 5D is an accumulation value map illustrating an accumulation value for each of pixels in the case in which the accumulation and summation are performed three times from a left direction to a right direction according to an exemplary embodiment of the present disclosure.

FIG. 6A is an accumulation value map from which an average of the accumulation values of the respective directions is derived, according to an exemplary embodiment of the present disclosure.

FIG. 6B is an accumulation value map in which the relaxation accumulation and summation are performed once in the accumulation value map of FIG. 6A, according to an exemplary embodiment of the present disclosure.

FIG. 6C is an accumulation value map in which the relaxation accumulation and summation calculation is performed once more in the accumulation value map of FIG. 6B, according to an exemplary embodiment of the present disclosure.

FIG. 7A is an accumulation value map illustrating a relaxation accumulation value when a disparity value is 0, according to an exemplary embodiment of the present disclosure.

FIG. 7B is an accumulation value map illustrating the relaxation accumulation value when the disparity value is 1, according to an exemplary embodiment of the present disclosure.

FIG. 7C is an accumulation value map illustrating the relaxation accumulation value when the disparity value is 9, according to an exemplary embodiment of the present disclosure.

DETAILED DESCRIPTION

Figure 1:
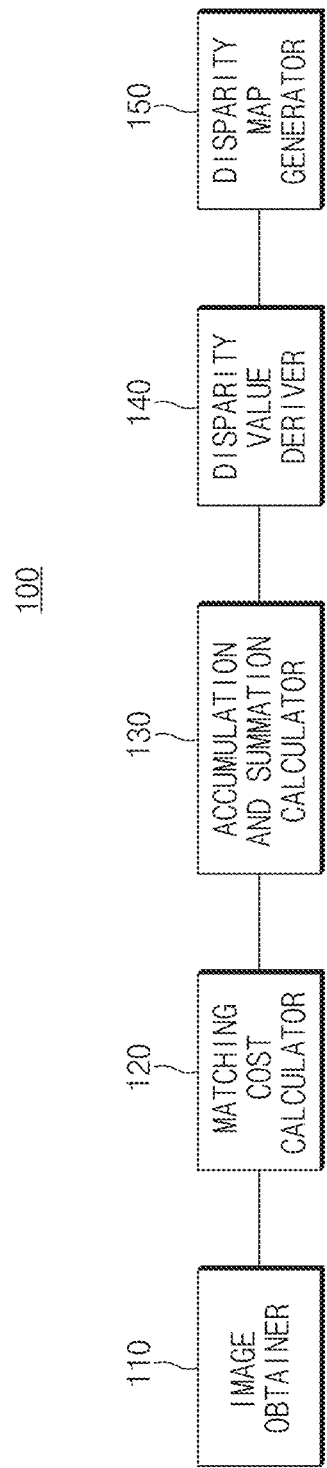
FIG. 1 is a block diagram of a system for generating a disparity map according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or gaups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to the illustrative drawings. It is to be noted that in giving reference numerals to components of each of the accompanying drawings, the same components will be denoted by the same reference numerals even though they are shown in different drawings.

Further, in describing exemplary embodiments of the present disclosure, well-known constructions or functions will not be described in detail in the case in which they may unnecessarily obscure the understanding of the exemplary embodiments of the present disclosure.

FIG. 1 is a block diagram of a system for generating a disparity map according to an exemplary embodiment of the present disclosure.

Referring to FIG. 1, a system 100 for generating a disparity map may include an image obtainer 110, a matching cost calculator 120, an accumulation and summation calculator 130, a disparity value deriver 140, and a disparity map generator 150. The image obtainer 110 may be a camera or an image receiver. In addition, the matching cost calculator 120, the accumulation and summation calculator 130, the disparity value deliver 140, and the disparity map generator 150 may be one or more controllers) incorporating processor(s) for carrying out the respective functions, and each may embodied in a non-transitory computer readable medium.

However, the components illustrated in FIG. 1 are not essential components. Therefore, the system 100 for generating a disparity map having components more or less than the components illustrated in FIG. 1 may also be implemented.

The image obtainer 110 may obtain a left image and a right image. The image obtainer 110 may be a camera that photographs an image, and may also be an image receiver that receives the image from the camera. In the case in which the image obtainer 110 is the camera, the image obtainer 110 may be two cameras which are spaced apart from each other in a horizontal direction. In addition, in the case in which the image obtainer 110 is the image receiver, the camera that photographs the received image may be two cameras which are spaced apart from each other in the horizontal direction.

As such, even though the two cameras which are spaced apart from each other in the horizontal direction photograph the image in the same direction, the images obtained by the respective cameras have a difference due to a spaced distance of the two cameras, and the system 100 for generating a disparity map according to the present disclosure generates the disparity map based on the above-mentioned difference.

The matching cost calculator 120 may calculate matching cost for each of pixels of the left image and the right image. According to the present disclosure, the matching cost calculator 120 may use an algorithm of matching stereo images based on a ground. The algorithm of matching stereo images based on the ground is an algorithm that calculates the matching cost by comparing ground images of the left image and the right image, and calculates the matching cost by comparing images over the ground of the left image and the right image. According to the algorithm of matching stereo images based on the ground, since a ground disparity labeling and an object disparity labeling are calculated to be separated from each other, the disparity map may be generated to be more robust with respect to the ground than a semi-global method according to the related art The accumulation and summation calculator 130 may calculate an accumulation value for each of pixels based on the calculated matching cost, and calculate a relaxation accumulation and summation based on accumulation values around the pixel, to thereby calculate a relaxation accumulation value for each of the pixels.

Fast, a method for calculating an accumulation value in a vertical direction and a horizontal direction by the accumulation and summation calculator 130 will be described with reference to FIGS. 2A to 3B.

Figure 2A:
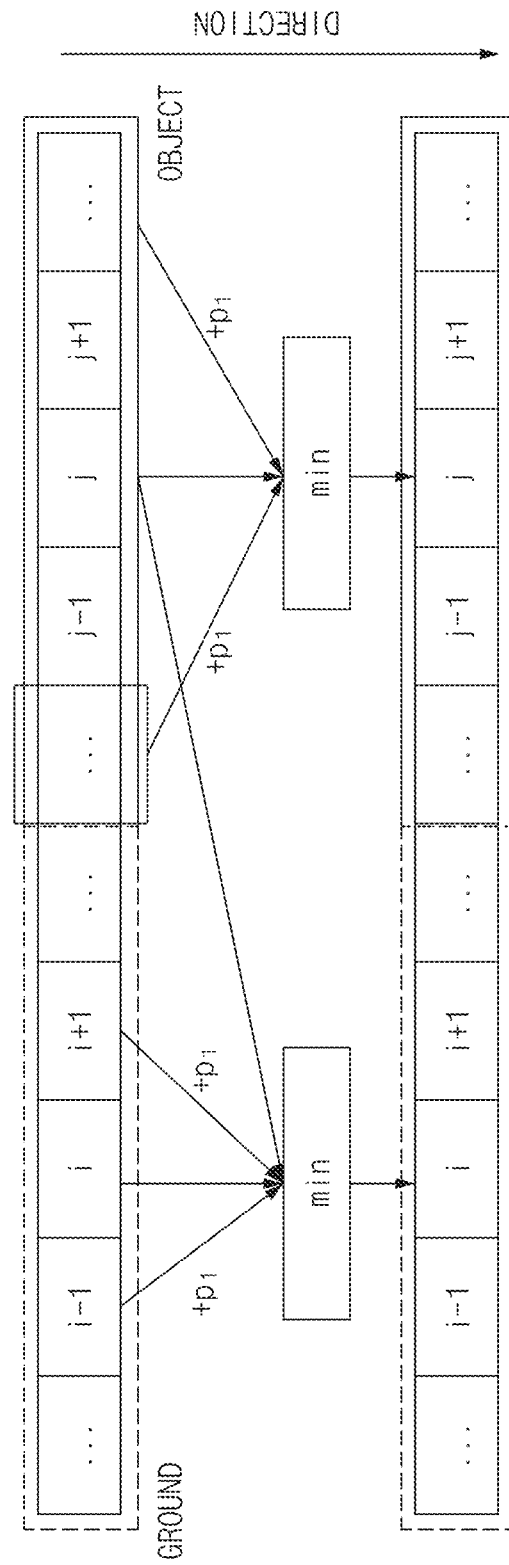
FIG. 2A is a diagram illustrating a process of accumulating and summing matching cost from top to bottom in a vertical direction according to an exemplary embodiment of the present disclosure.
Figure 2B:
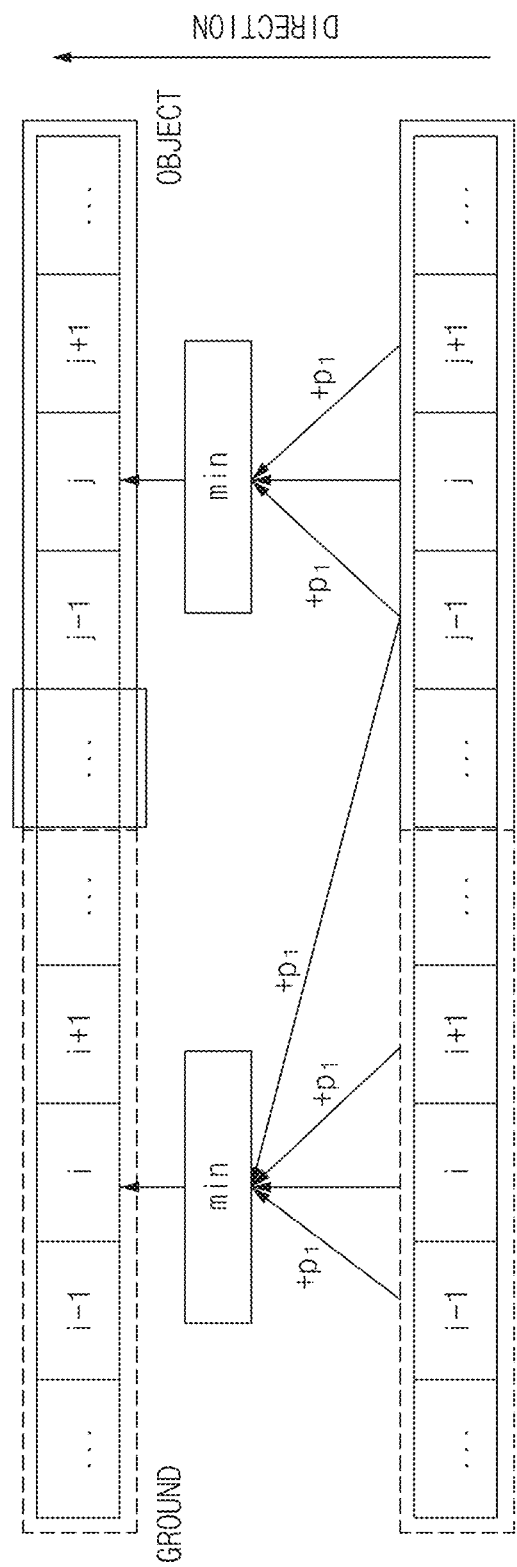
FIG. 2B is a diagram illustrating a process of accumulating and summing matching cost from bottom to top in a vertical direction according to an exemplary embodiment of the present disclosure.

FIG. 2A is a diagram illustrating a process of accumulating and summing matching cost from top to bottom in a vertical direction according to an exemplary embodiment of the present disclosure. FIG. 2B is a diagram illustrating a process of accumulating and summing matching cost from bottom to top in a vertical direction according to an exemplary embodiment of the present disclosure.

Figure 3A:
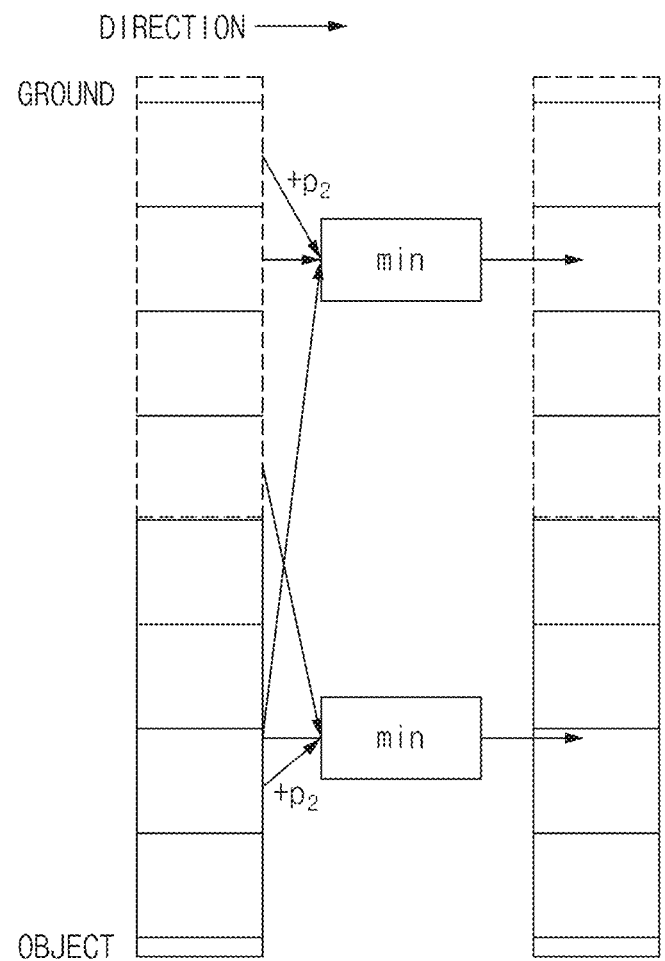
FIG. 3A is a diagram illustrating a process of accumulating and summing matching cost from left to right in a horizontal direction according to an exemplary embodiment of the present disclosure.
Figure 3B:
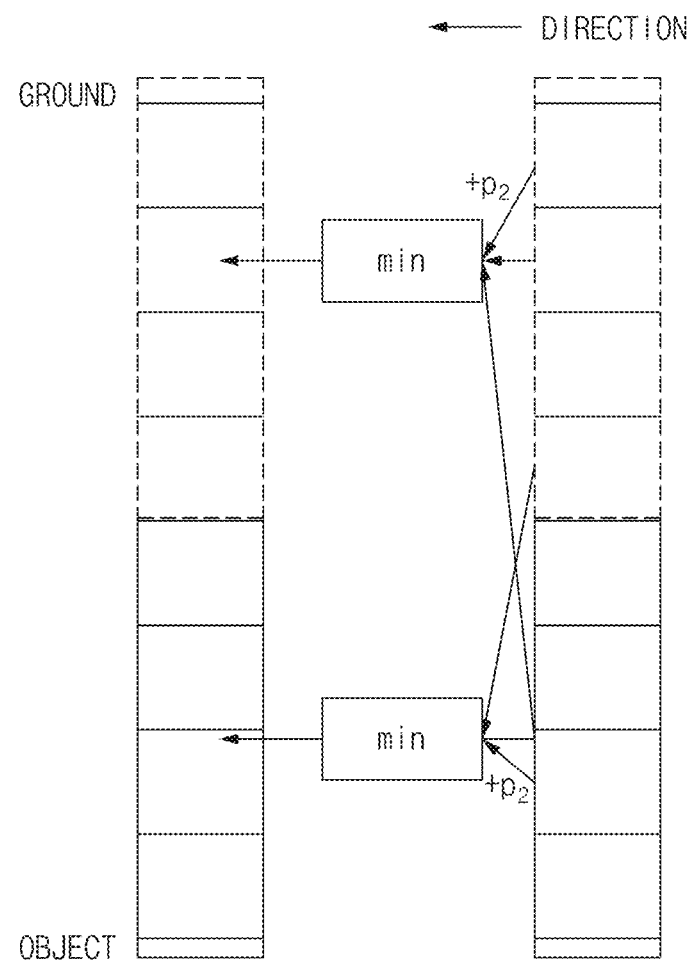
FIG. 3B is a diagram illustrating a process of accumulating and summing matching cost from right to left in a horizontal direction according to an exemplary embodiment of the present disclosure.

FIG. 3A is a diagram illustrating a process of accumulating and summing matching cost from left to right in a horizontal direction according to an exemplary embodiment of the present disclosure. FIG. 3B is a diagram illustrating a process of accumulating and summing matching cost from right to left in a horizontal direction according to an exemplary embodiment of the present disclosure.

In the case in which the matching cost is accumulated and summed in the vertical direction, the accumulation and summation calculator 130 may calculate a current accumulation value by summing a minimum value among an accumulation value of a previous direction of the corresponding disparity, a value obtained by summing a first accumulation constant to an accumulation value of a direction around a disparity value, and a value obtained by summing a second accumulation constant to a minimum value of the accumulation value of the previous direction to current matching cost This may be represented as in the following Equation 1.

$$L_R(p,d)=C(p,d)+\min(L_R(p-r,d), L_R(p-r,d-1)+p_1, L_R(p-r,d+1)+p_1, \min(L_R(p-r,i)+p_2))$$ [Equation 1]

The expression $L_R(p,d)$ is the accumulation value, $p_1$ is the first accumulation constant, $p_2$ is the second accumulation constant, $C(p,d)$ is the matching cost, p is a pixel coordinate, d is the disparity value, and r is a direction of the accumulation and summation.

FIG. 2A illustrates a process of accumulating and summing matching cost from a top direction to a bottom direction, and FIG. 2B illustrates a process of accumulating and summing matching cost from a bottom direction to a top direction.

As illustrated in FIGS. 2A and 2B, the accumulation and summation calculator 130 may calculate the current accumulation value by summing the minimum value among the accumulation value of the previous direction of the corresponding disparity, the value obtained by summing the first accumulation constant to the accumulation value of the direction around the disparity value, and the value obtained by summing the second accumulation constant to the minimum value of the accumulation value of the previous direction to the current matching cost The accumulation constants are any constants summed to the accumulation value of the previous direction or the accumulation value of the direction around the disparity value, and the accumulation constants are summed, thereby making it possible to reinforce vertical connectivity.

In addition, in the case in which the matching cost is accumulated and summed in the horizontal direction, the accumulation and summation calculator 130 may calculate the current accumulation value by summing the minimum value among the accumulation value of the previous direction of the corresponding disparity and the value obtained by summing the second accumulation constant to the minimum value of the accumulation value of the previous direction to the current matching cost This may be represented as in the following Equation 2.

$$L_R(p,d)=C(p,d)+\min(L_R(p-r,d), \min(L_R(p-r,i)+p2)$$ [Equation 2]

The expression $L_R(p,d)$ is the accumulation value, p1 is the first accumulation constant, p2 is the second accumulation constant, $C(p,d)$ is the matching cost, p is a pixel coordinate, d is the disparity value, and r is a direction of the accumulation and summation.

FIG. 3A illustrates a process of accumulating and summing matching cost from a left direction to a right direction, and FIG. 3B illustrates a process of accumulating and summing matching cost from a right direction to a left direction.

As illustrated in FIGS. 3A and 3B, the accumulation and summation calculator 130 may calculate the current accumulation value by summing the minimum value among the accumulation value of the previous direction of the corresponding disparity and the value obtained by summing the second accumulation constant to the minimum value of the accumulation value of the previous direction to the current matching cost Unlike the accumulation and summation in the vertical direction, when the accumulation and summation in the horizontal direction are performed, only the second accumulation constant is used, and the accumulation constant is summed, thereby making it possible to reinforce horizontal connectivity.

The accumulation and summation calculator 130 may perform a relaxation accumulation and summation calculation based on the accumulation values which are accumulated and summed in the vertical direction and the horizontal direction as described above. The relaxation accumulation and summation calculation is an accumulation and summation calculation based on accumulation values around a current pixel, and an association between the current pixel and surrounding pixels may be increased by performing the relaxation accumulation and summation calculation. Hereinafter, a method for performing a relaxation accumulation and summation calculation will be described with reference to FIG. 4 and Equation 3.

Figure 4:
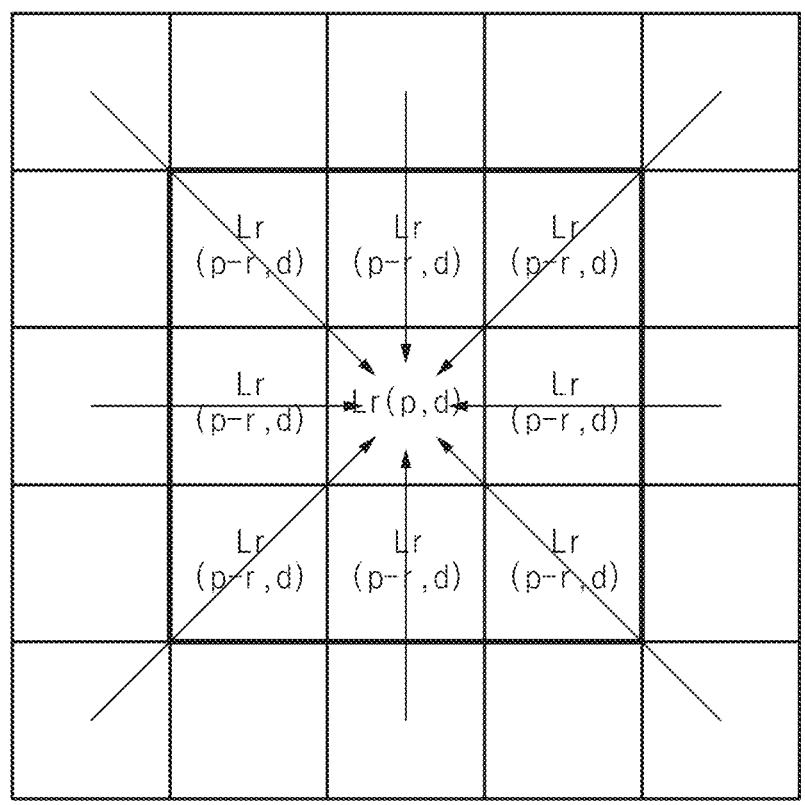
FIG. 4 is a diagram illustrating a process of relaxation-accumulating and summing matching cost according to an exemplary embodiment of the present disclosure.

FIG. 4 is a diagram illustrating a process of relaxation accumulating and summing matching cost according to an exemplary embodiment of the present disclosure.

The accumulation and summation calculator 130 may multiply relation coefficients between the disparity value of the current pixel and disparity values of surrounding pixels of the current pixel with the accumulation value of the current pixel, and calculate an average of the multiplied values as a relaxation accumulation value. In addition, the accumulation and summation calculator 130 may repeat the relaxation accumulation and summation based on the calculated relaxation accumulation value. That is, the accumulation and summation calculator 130 may multiply the relation coefficients between the disparity value of the current pixel and the disparity values of the surrounding pixels of the current pixel with the relaxation accumulation value of the current pixel, and calculate an average of the multiplied values as a relaxation repeated relaxation accumulation value. Here, the relation coefficient is (an estimated disparity of a current pixel—an estimated disparity of surrounding pixels)/(a total of allowable disparity range).

This may be represented as in the following Equation 3.

$$L^n(p, d) = \frac{1}{n(r)} \sum_r L_r^n(p, d) \times q(p, p-r)$$ [Equation 3]

The expression $L_r^n(p,d)$ is an n-th repeated accumulation value, n(r) is the number of surrounding values of the current pixel, q(p,p−r) is the relation coefficient between the disparity value of the current pixel and the disparity values of the surrounding pixels, and r is a direction of the accumulation and summation, d is the disparity value, and p−r is a previous value of the current pixel in the r direction.

An initial value of the accumulation value ($L_r^n(p,d)$) is the matching cost ($L_r^0(p,d)=C(p,d)$), and a value obtained by multiplying the relation coefficients between the disparity value of the current pixel and the disparity values of the surrounding pixels with the matching cost and dividing the multiplied value by the number of surrounding accumulation values is the relaxation accumulation value.

The accumulation and summation calculator 130 may perform the repeated relaxation accumulation and summation calculation by substituting the relaxation accumulation value calculated as the accumulation value ($L_r^n(p,d)$).

The disparity value deriver 140 may derive a disparity value for each of the pixels based on the calculated accumulation value. The disparity value deriver 140 may derive a disparity value that the calculated accumulation value becomes a minimum, as the disparity value of the current pixel. In Equation 3, d, which is the disparity value, is included, and the disparity value deliver 140 derives d which makes the accumulation value minimum as the disparity value of the current pixel.

The disparity map generator 150 may generate the disparity map based on the derived disparity value. That is, the disparity value deliver 140 may derive disparity values of all pixels of an image, and the image on which the disparity value of each of the pixels is shown becomes the disparity map.

Hereinafter, an example of a process of calculating the accumulation value based on the matching cost calculated by the matching cost calculator 120 and deriving the disparity value will be described with reference to FIGS. 5A to 7C.

Figures 5C, 5D:
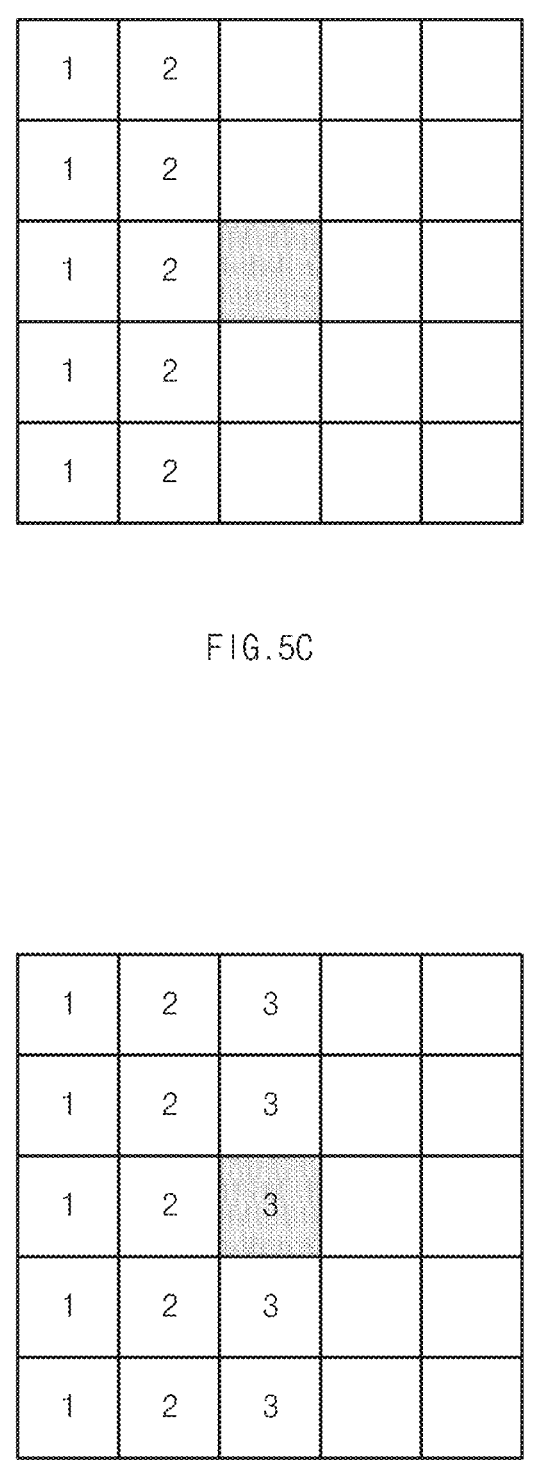

FIG. 5A is a matching cost map illustrating matching cost for each of pixels according to an exemplary embodiment of the present disclosure. FIG. 5B is an accumulation value map illustrating an accumulation value for each of pixels in the case in which the accumulation and summation are performed once from a left direction to a right direction according to an exemplary embodiment of the present disclosure. FIG. 5C is an accumulation value map illustrating an accumulation value for each of pixels in the case in which the accumulation and summation are performed twice from a left direction to a right direction according to an exemplary embodiment of the present disclosure. FIG. 5D is an accumulation value map illustrating an accumulation value for each of pixels in the case in which the accumulation and summation are performed three times from a left direction to a right direction according to an exemplary embodiment of the present disclosure.

Figure 6C:
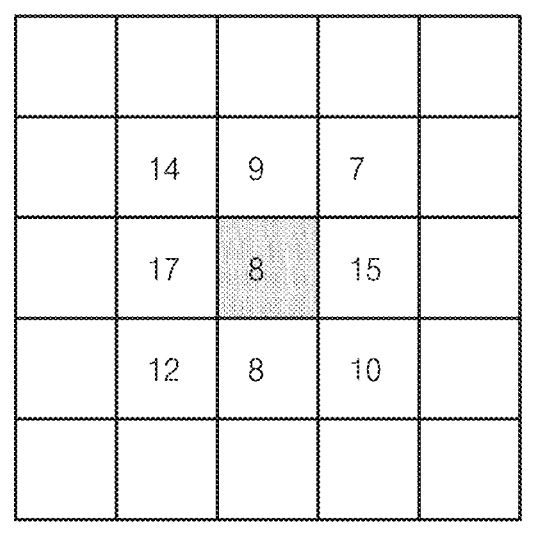

FIG. 6A is an accumulation value map from which an average of the accumulation values of the respective directions is derived, according to an exemplary embodiment of the present disclosure. FIG. 6B is an accumulation value map in which the relaxation accumulation and summation are performed once in the accumulation value map of FIG. 6A, according to an exemplary embodiment of the present disclosure. FIG. 6C is an accumulation value map in which the relaxation accumulation and summation calculation is performed once more in the accumulation value map of FIG. 6B, according to an exemplary embodiment of the present disclosure.

Figures 7A, 7B:
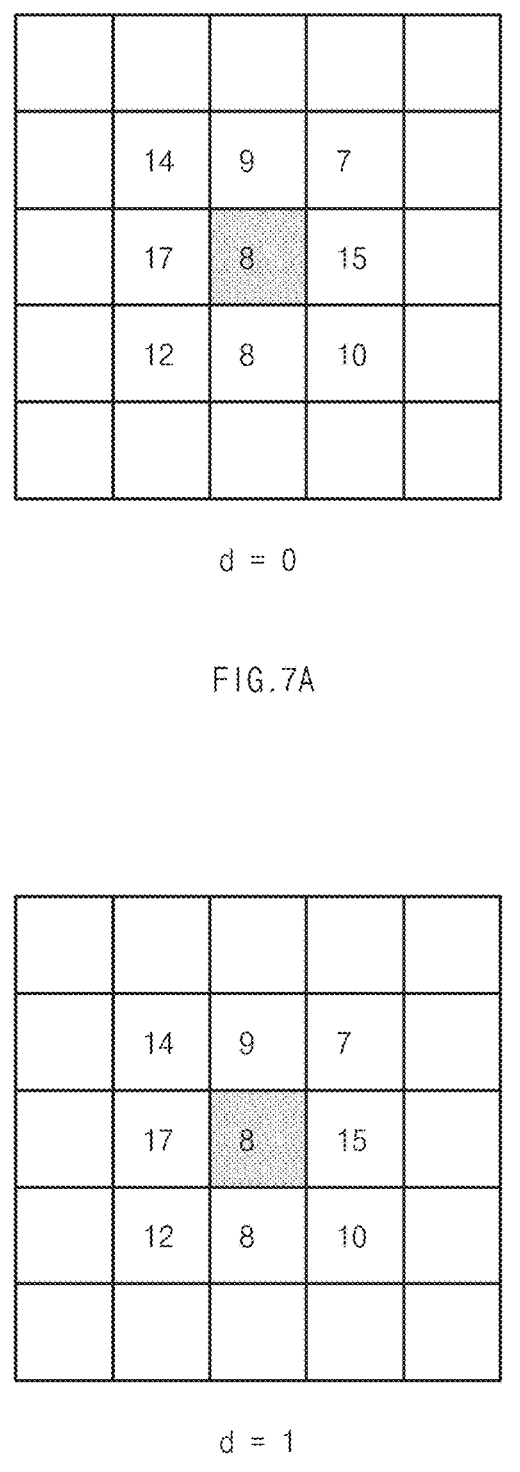
Figure 7C:
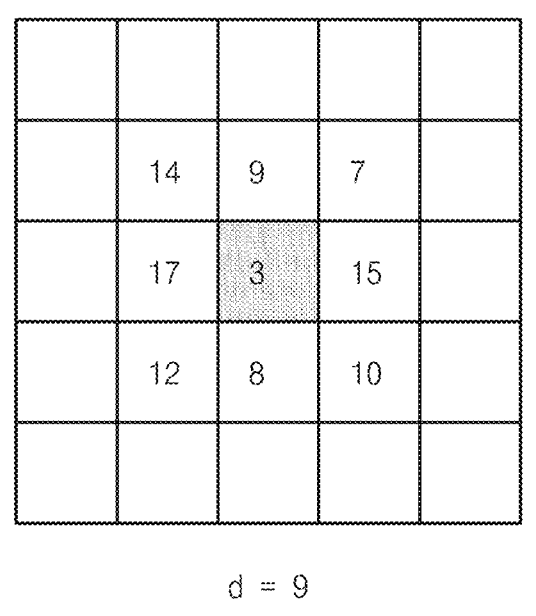

FIG. 7A is an accumulation value map illustrating a relaxation accumulation value when a disparity value is 0, according to an exemplary embodiment of the present disclosure. FIG. 7B is an accumulation value map illustrating the relaxation accumulation value when the disparity value is 1, according to an exemplary embodiment of the present disclosure. FIG. 7C is an accumulation value map illustrating the relaxation accumulation value when the disparity value is 9, according to an exemplary embodiment of the present disclosure.

Referring to FIG. 5A, the matching cost of when the disparity is 1 is 1 in all pixels. The accumulation and summation calculator 130 performs the accumulation and summation calculation for the respective directions, and FIGS. 5B to 5D illustrate a process of performing an accumulation and summation calculation from a left to a right in a horizontal direction.

As described above, since the initial value of the accumulation value equals to the matching cost, the accumulation value of pixels of the leftmost column in FIG. 5B is 1.

The accumulation and summation calculator 130 may calculate an accumulation value of a second column using the Equation 2. The accumulation and summation calculator 130 derives an accumulation value of 2 as illustrated in FIG. 5C by summing a value obtained by adding the second accumulation constant to the minimum value among the accumulation values of previous directions of all disparity labels and 1, which is the minimum value among the accumulation values of the previous directions of a current disparity label to 1, which is the current matching cost.

The accumulation and summation calculator 130 may calculate an accumulation value of a third column again using the Equation 2. The accumulation and summation calculator 130 derives an accumulation value of 3 as illustrated in FIG. 5D by summing a value obtained by adding the second accumulation constant to the minimum value among the accumulation values of the previous directions of all disparity labels and 2, which is the minimum value among the accumulation values of the previous directions of the current disparity label to 1, which is the current matching cost The accumulation and summation calculator 130 may calculate the accumulation values of all directions and the relaxation accumulation value using the method described above. FIG. 6A illustrates the accumulation values calculated by the accumulation and summation calculator 130 using the method described above.

That is, the accumulation and summation calculator 130 multiplies the current accumulation value of the middle pixel, which is the current pixel of FIG. 6A, using the Equation 3, and derives the relaxation accumulation value as in FIG. 6B by dividing the multiplied value by the number of surrounding accumulation values.

The accumulation and summation calculator 130 may again perform the relaxation accumulation and summation calculation for the relaxation accumulation value derived using the Equation 3. A result obtained by performing the relaxation accumulation and summation calculation once more is shown in FIG. 6C, and the number of times that the accumulation and summation calculator 130 may perform the relaxation accumulation and summation calculation is not limited to the above-mentioned illustration.

The disparity value deriver 140 may derive a disparity value that the relaxation accumulation value calculated by the accumulation and summation calculator 130 becomes a minimum, as the disparity value of the current pixel.

FIG. 7A illustrates the relaxation accumulation value of when the disparity value is 0, FIG. 7B illustrates the relaxation accumulation value of when the disparity value is 1, and FIG. 7C illustrates the relaxation accumulation value of when the disparity value is 9. Referring to FIGS. 7A to 7C, the relaxation accumulation value of when the disparity value is 9 is 3, which is the minimum value, and the disparity value deriver 140 may derive that the disparity value is 9.

Meanwhile, a stixel is applied according to another exemplary embodiment of the present disclosure to increase an association of pixels, thereby making it possible to remove holes which may exhibit on the disparity map and to generate the disparity map having reinforced connectivity.

Figure 8:
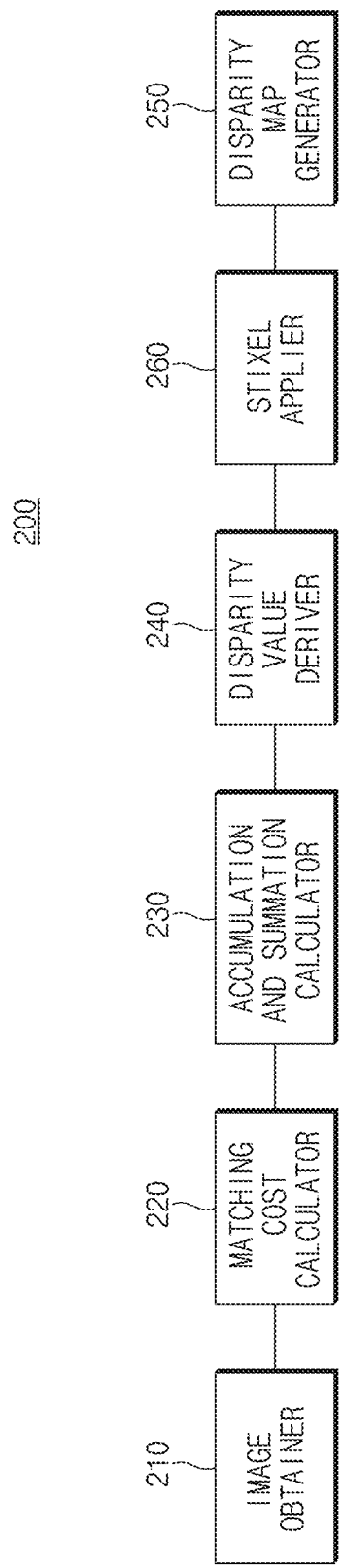
FIG. 8 is a block diagram of a system for generating a disparity map according to another exemplary embodiment of the present disclosure.

FIG. 8 is a block diagram of a system for generating a disparity map according to another exemplary embodiment of the present disclosure.

Referring to FIG. 8, a system 200 for generating a disparity map according to another exemplary embodiment of the present disclosure may include an image obtainer 210, a matching cost calculator 220, an accumulation and summation calculator 230, a disparity value deliver 240, a disparity map generator 250, and a stixel applier 260.

However, the components illustrated in FIG. 8 are not essential components. Therefore, the system 200 for generating a disparity map having components more or less than the components illustrated in FIG. 8 may also be implemented.

Since the image obtainer 210, the matching cost calculator 220, the accumulation and summation calculator 230, the disparity value deliver 240, and the disparity map generator 250 are the same as those described with reference with FIG. 1, a description thereof will be omitted The stixel applier 260 may group pixels having the same disparity value in the vertical direction or the horizontal direction to configure a stixel. In the case in which a pixel distance between a plurality of stixels which are configured in the same direction to be located on the same line and have the same disparity value is a preset pixel value or less, the stixel applier 260 may change disparity values of pixels located between the plurality of stixels to disparity values of the plurality of stixels.

The stixel applier 260 may bind the pixels having the same disparity value in the vertical direction or the horizontal direction into one group to configure the stixel. If the disparity value is normally derived, a ground image has the same disparity value in the horizontal direction and includes one stixel.

However, since it is difficult to normally derive the disparity value in the case of bad weather, a portion of the ground image has the same disparity value in the horizontal direction, but other portions thereof have different disparity values. Therefore, the ground image may not include one stixel.

In the case in which the pixel distance between the plurality of stixels which are configured in the same direction to be located on the same line and have the same disparity value is the preset pixel value or less, the stixel applier 260 may change the disparity values of pixels located between the plurality of stixels to the disparity values of the plurality of stixels.

In the case in which the plurality of stixels are configured in the same direction to be located on the same line, and a spaced distance between the plurality of stixels is small, it may be regarded that pixels having different disparity values and located between the plurality of stixels have erroneous disparity values due to the bad weather. By reflecting the above-mentioned aspect, the stixel applier 260 may perform a correction in which the disparity value of the pixel having the erroneous disparity value is changed to the disparity value of the plurality of stixels.

Figure 9:
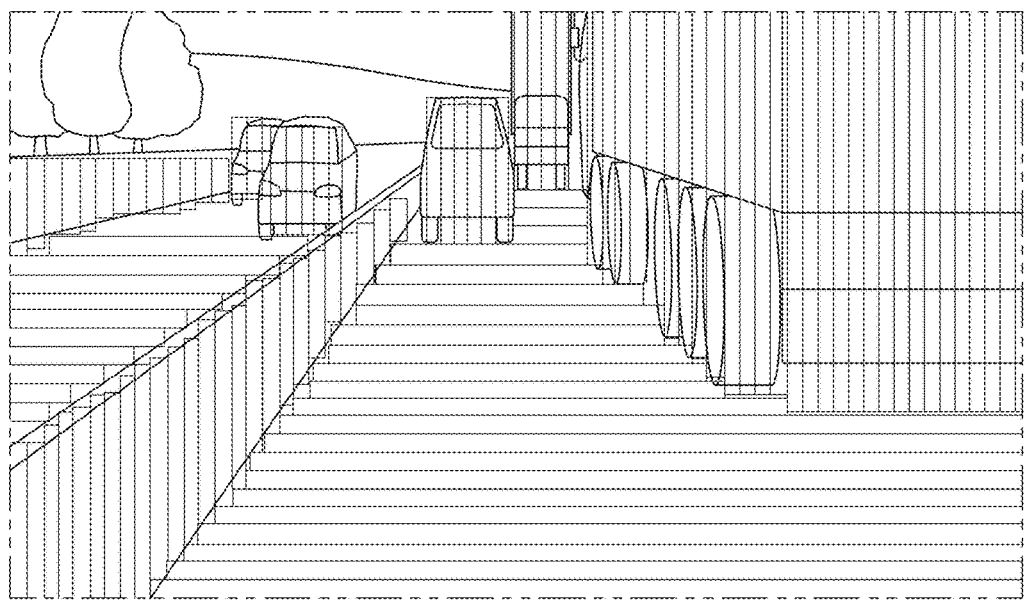
FIG. 9 is a disparity map to which a stixel is applied, according to an exemplary embodiment of the present disclosure.

FIG. 9 is a disparity map to which a stixel is applied, according to an exemplary embodiment of the present disclosure.

When the disparity value is corrected by applying the stixel as described above, the pixels between the plurality of stixels have the same disparity value as that of the plurality of stixels. Therefore, the plurality of stixels may include one stixel as illustrated in FIG. 9.

Hereinafter, a method for generating a disparity map based on the configurations described above will be described with reference to FIG. 10.

Figure 10:
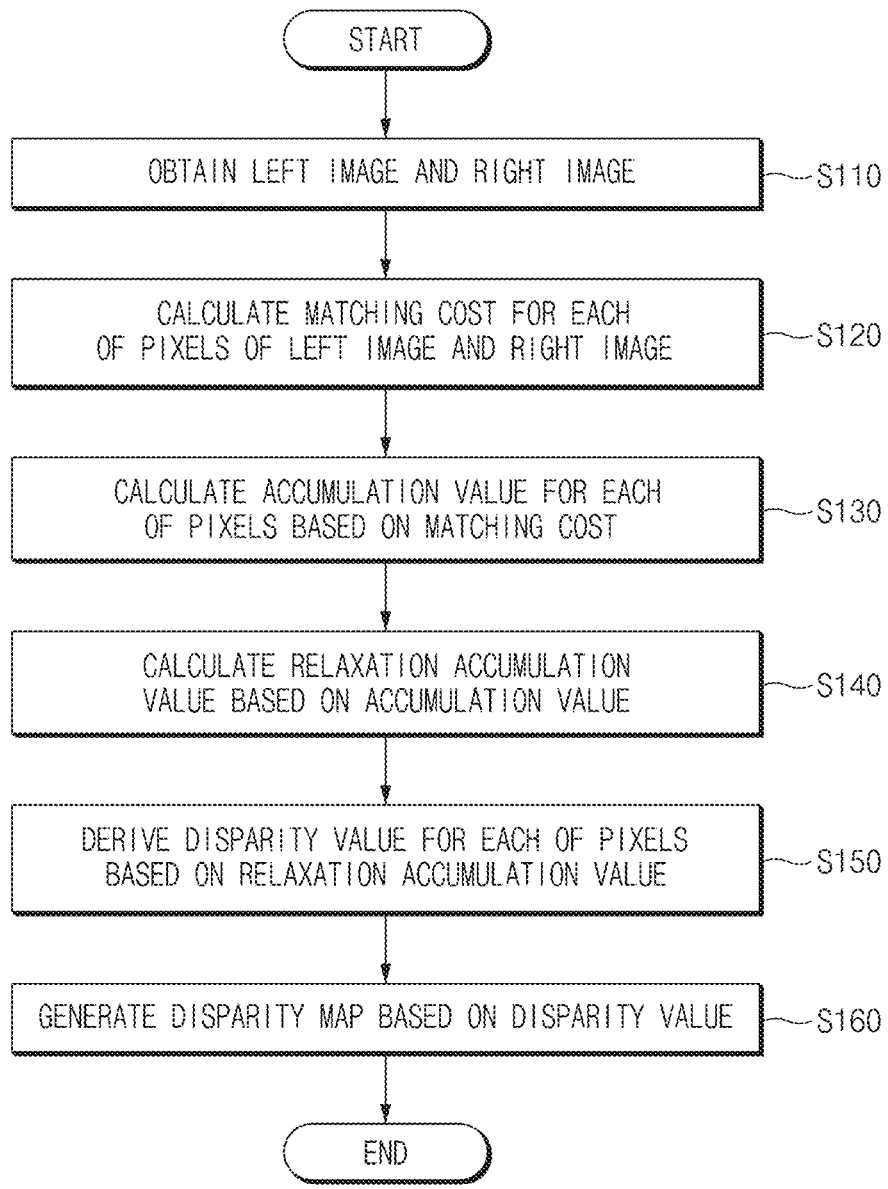
FIG. 10 is a flow chart illustrating a method for generating a disparity map according to an exemplary embodiment of the present disclosure.

FIG. 10 is a flow chart illustrating a method for generating a disparity map according to an exemplary embodiment of the present disclosure.

Referring to FIG. 10, the method for generating a disparity map according to an exemplary embodiment of the present disclosure may include an operation (S110) of obtaining a left image and a right image, an operation (S120) of calculating a matching cost of the left image and the right image, an operation (S130) of calculating an accumulation value for each of pixels based on the matching cost, an operation (S140) of calculating a relaxation accumulation value based on the accumulation value for each of the pixels, an operation (S150) of deriving a disparity value for each of pixels based on the relaxation accumulation value, and an operation (S160) of generating the disparity map based on the disparity value.

Hereinafter, the operations (S110 to S160) will be described in detail.

In the operation (S110), the image obtainer 110 may obtain the left image and the right image. The left image and the right image are images which are photographed by two cameras, respectively, which are spaced apart from each other in a horizontal direction. The image obtainer 110 may directly obtain the image as the camera, and may receive the image from the camera as an image receiver.

In the operation (S120), the matching cost calculator 120 may calculate the matching cost for each of pixels of the left image and the right image according to an algorithm of matching stereo images based on a ground. As described above, the matching cost calculator 120 may calculate the matching cost by comparing ground images of the left image and the right image, and may calculate the matching cost by comparing images over the ground of the left image and the right image.

In the operation (S130), the accumulation and summation calculator 130 may calculate the accumulation value for each of the pixels based on the matching cost. The accumulation and summation calculator 130 may calculate the accumulation value in the vertical direction and the horizontal direction as described above.

In the operation (S140), the accumulation and summation calculator 130 may perform a relaxation accumulation and summation calculation based on the accumulation value to calculate a relaxation accumulation value. The accumulation and summation calculator 130 may calculate the relaxation accumulation value, which is an average of values obtained by multiplying each of relation coefficients between a disparity value of a current pixel and disparity values of surrounding pixels with the accumulation value of the current pixel, and since a detailed method for calculating an accumulation value is described above, a description thereof will be omitted In addition, the accumulation and summation calculator 130 may repeatedly calculate the relaxation accumulation value based on the calculated relaxation accumulation value.

In the operation (S150), the disparity value deriver 140 may derive the disparity value for each of the pixels based on the relaxation accumulation value. The disparity value deriver 140 may derive a disparity value that the calculated relaxation accumulation value becomes a minimum, as the disparity value of the current pixel.

In the operation (S160), the disparity map generator 150 may generate the disparity map based on the derived disparity value. The image on which the disparity value of each of the pixels is shown becomes the disparity map.

Hereinafter, a method for generating a disparity map according to another exemplary embodiment of the present disclosure will be described with reference to FIG. 11.

Figure 11:
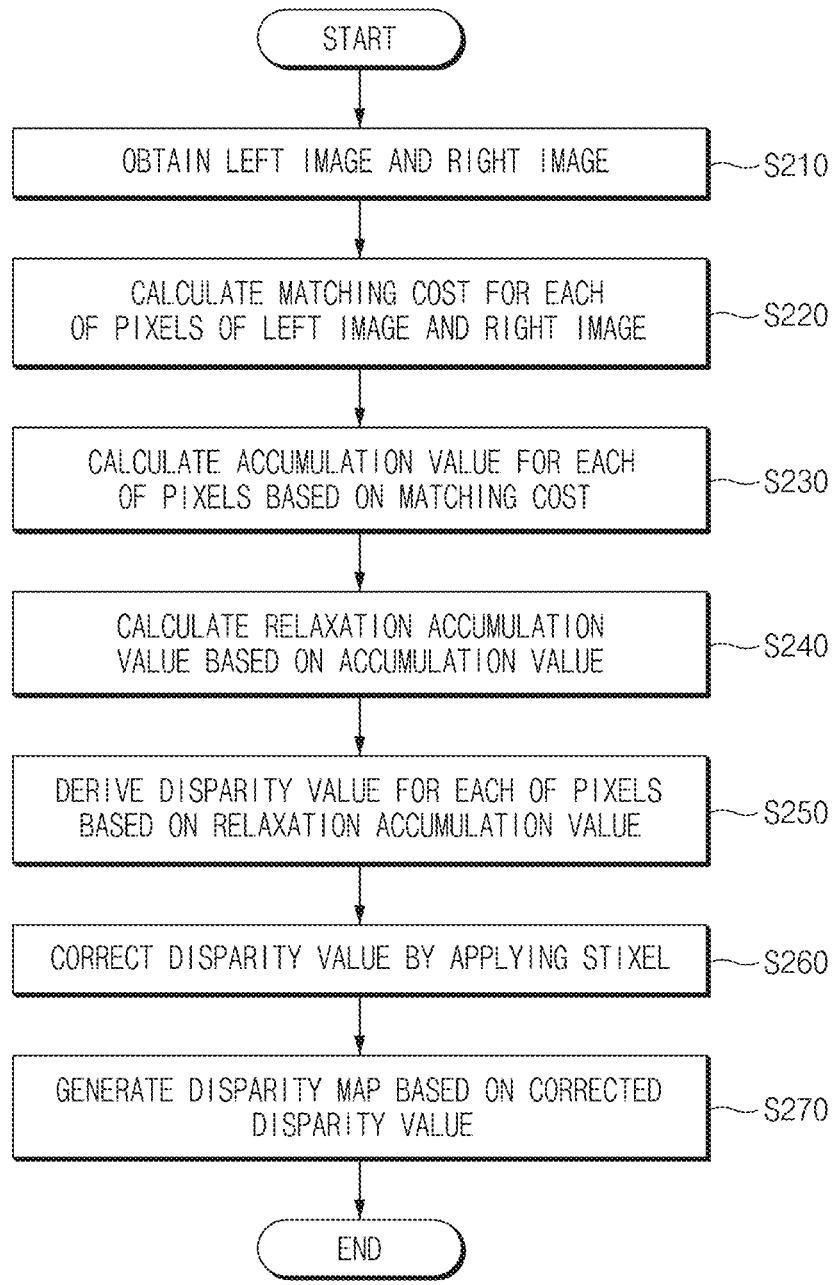
FIG. 11 is a flow chart illustrating a method for generating a disparity map according to another exemplary embodiment of the present disclosure.

FIG. 11 is a flow chart illustrating a method for generating a disparity map according to another exemplary embodiment of the present disclosure.

Referring to FIG. 11, the method for generating a disparity map according to another exemplary embodiment of the present disclosure may include an operation (S210) of obtaining a left image and a right image, an operation (S220) of calculating a matching cost of the left image and the right image, an operation (S230) of calculating an accumulation value for each of pixels based on the matching cost, an operation (S240) of calculating a relaxation accumulation value based on the accumulation value for each of the pixels, an operation (S250) of deriving a disparity value for each of pixels based on the accumulation value, an operation (S260) of correcting the disparity value by applying a stixel, and an operation (S270) of generating the disparity map based on the disparity value.

Since the operations (S210 to S250, and S270) are the same as the operations (S110 to 160) described above, a description thereof will be omitted.

In the operation (S260), the stixel applier 260 may group pixels having the same disparity value in the vertical direction or the horizontal direction to configure a stixel. In the case in which a pixel distance between a plurality of stixels which are configured in the same direction to be located on the same line and have the same disparity value is a preset pixel value or less, a correction in which disparity values of pixels located between the plurality of stixels are changed to disparity values of the plurality of stixels may be performed.

By adding the operation (S260), holes which may occur in the disparity map using the image photographed in a bad weather environment are removed, thereby making it possible to obtain the disparity map having reinforced connectivity.

Figure 12A:
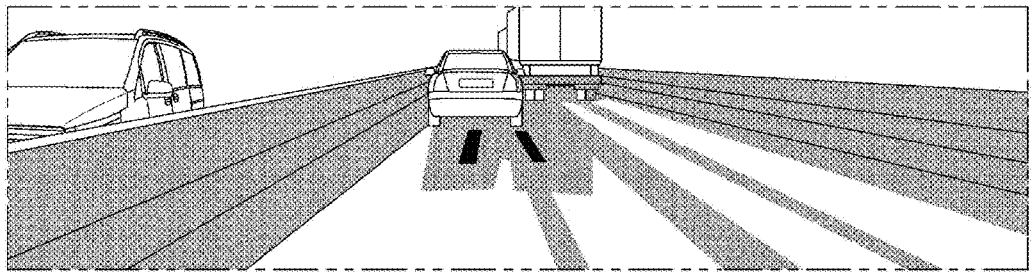
FIG. 12A is a left image obtained by an image obtainer according to an exemplary embodiment of the present disclosure.
Figure 12A:
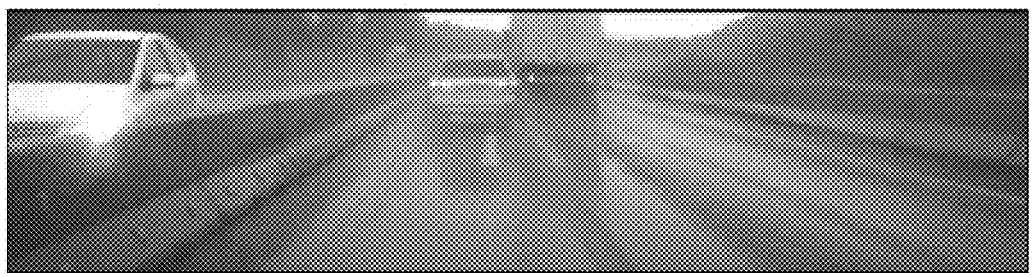
Figure 12B:
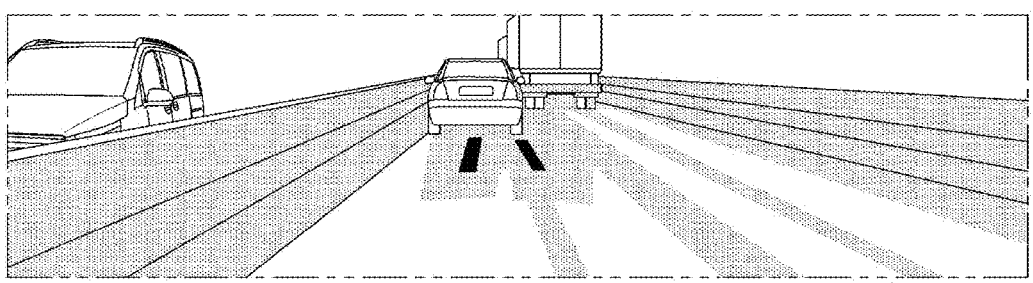
FIG. 12B is a right image obtained by the image obtainer according to an exemplary embodiment of the present disclosure.
Figure 12B:
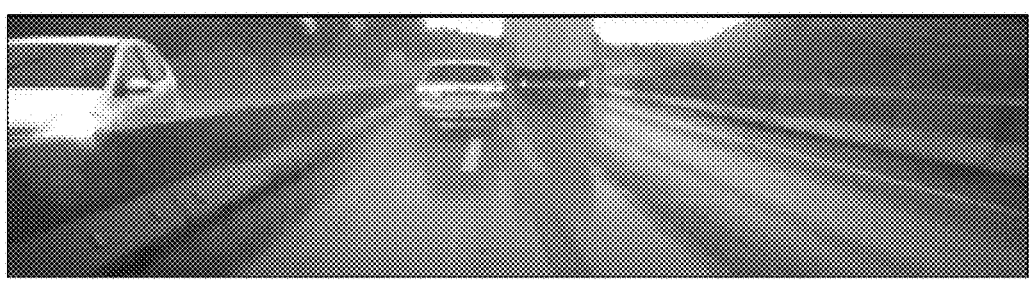

FIG. 12A is a left image obtained by an image obtainer according to an exemplary embodiment of the present disclosure. FIG. 12B is a right image obtained by the image obtainer according to an exemplary embodiment of the present disclosure.

Figure 13:
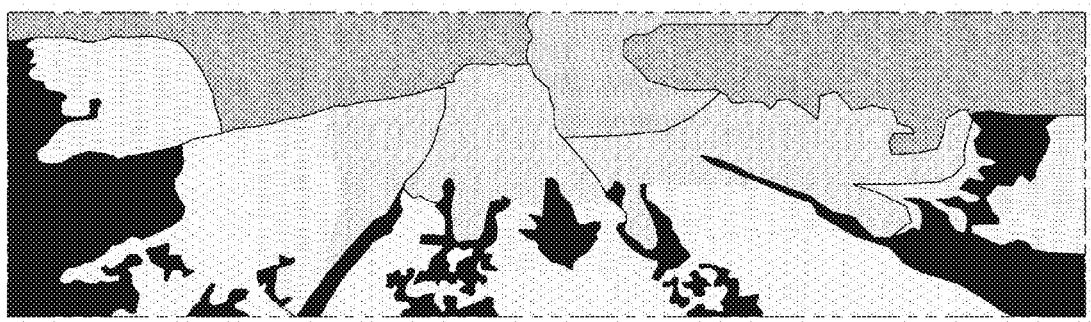
FIG. 13 is a disparity map generated by using the left image of FIG. 12A and the right image of FIG. 12B according to the method for matching stereo images according to the related art.
Figure 13:
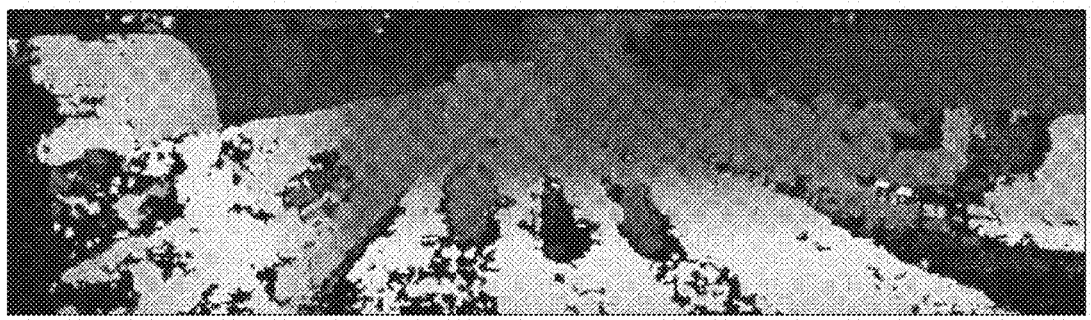
Figure 14:
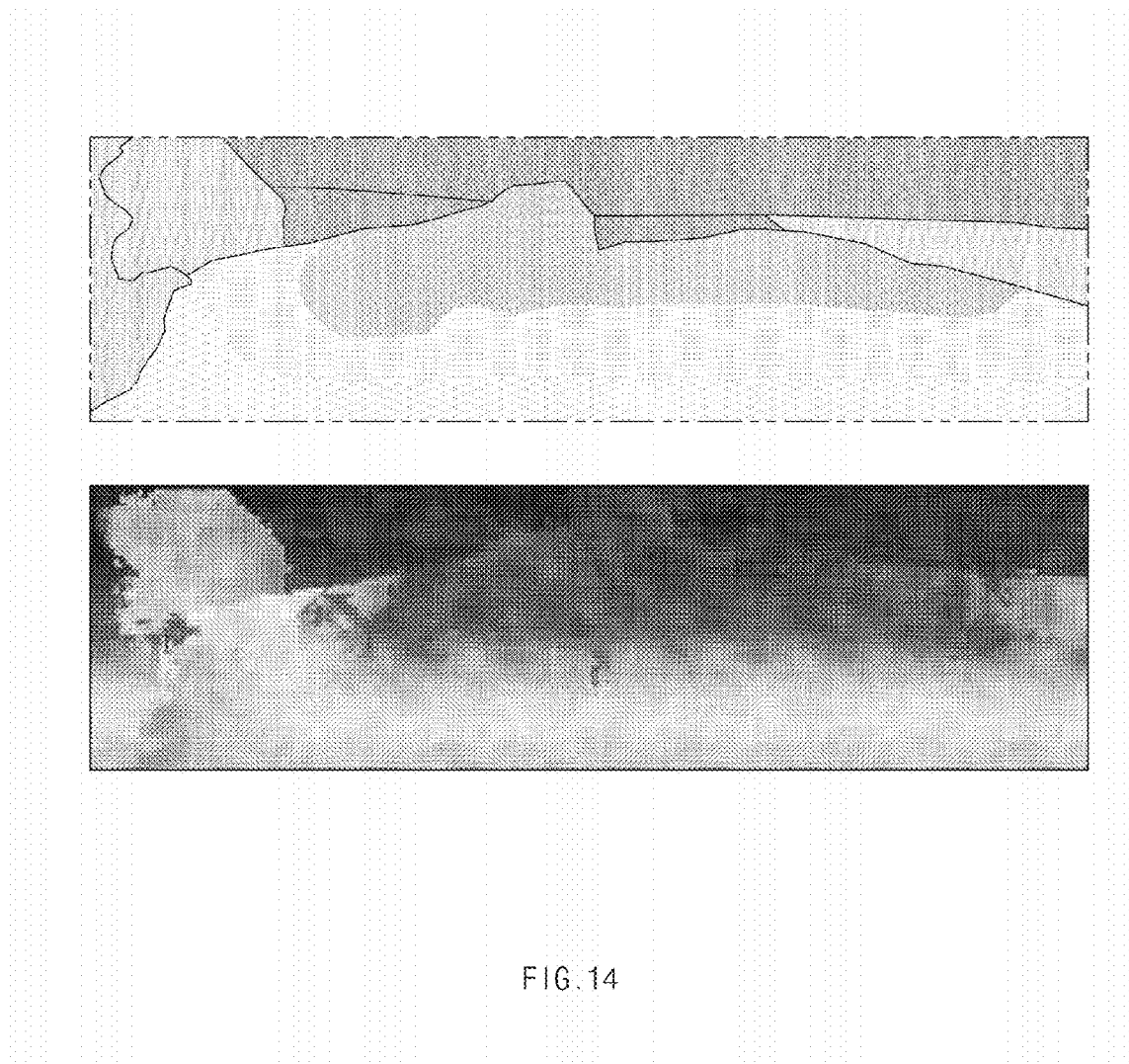
FIG. 14 is a disparity map generated by using the left image of FIG. 12A and the right image of FIG. 12B according to an exemplary embodiment of the present disclosure.

FIG. 13 is a disparity map generated by using the left image of FIG. 12A and the right image of FIG. 12B according to the method for matching stereo images according to the related art. FIG. 14 is a disparity map generated by using the left image of FIG. 12A and the right image of FIG. 12B according to an exemplary embodiment of the present disclosure.

FIGS. 12A and 12B illustrate the left image and the right image which may be obtained by the image obtainer of the system 100 or 200 for generating a disparity map according to the present disclosure. Referring to FIGS. 12A and 12B, it may be confirmed that weather of the image is wet bad weather.

According to a method for matching stereo images according to the related art (an image matching based on a local matching, an image matching based on a semi-global matching, etc.), it may be confirmed that erroneous disparity values are derived in the disparity map as illustrated in FIG. 13 to thereby cause the holes.

However, in the case in which the disparity map is generated by the configuration and method according to the present disclosure described above, it may be confirmed that the disparity is consistently represented to be horizontal to a road surface, and the disparity is represented to be vertical to the object as illustrated in FIG. 14, thereby making it possible to generate an excellent disparity map even in the bad weather.

Figure 15:
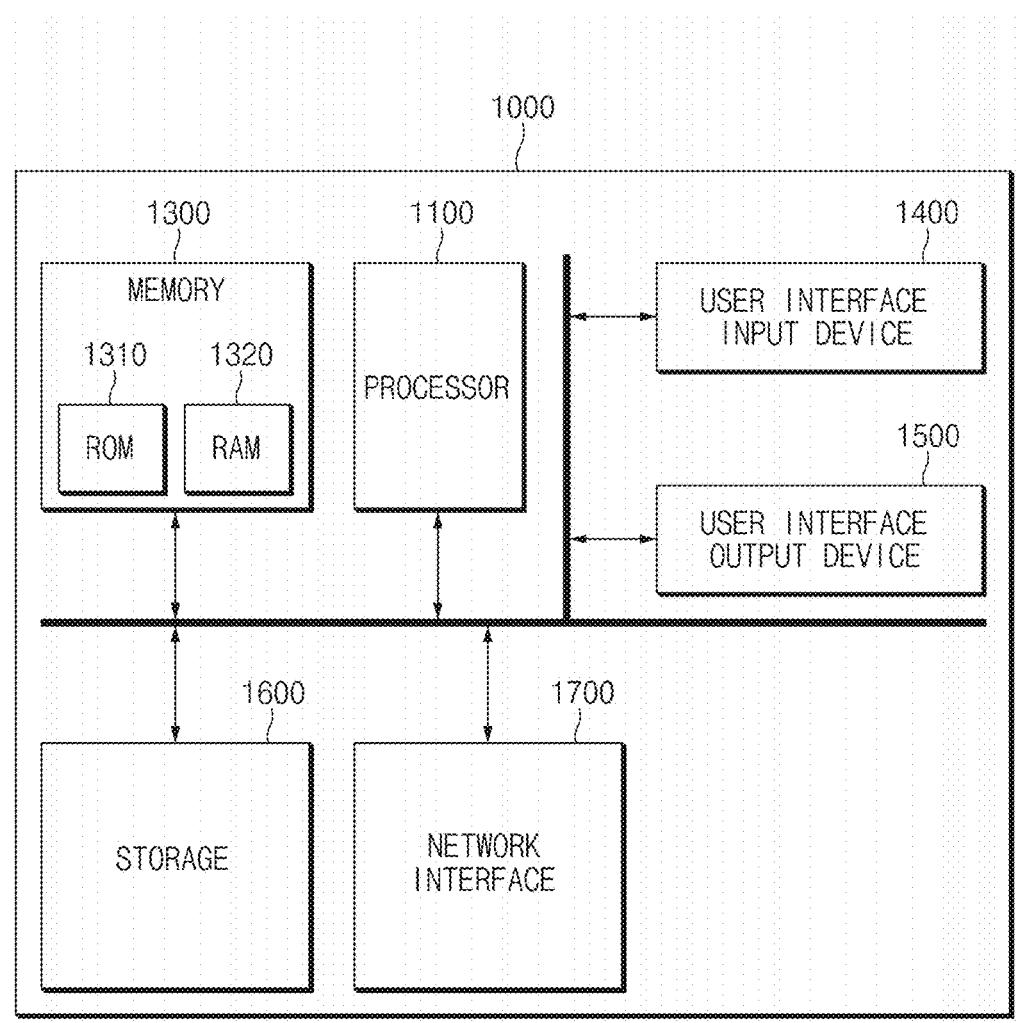
FIG. 15 is a block diagram illustrating a computing system that executes the method for generating a disparity map according to an exemplary embodiment of the present disclosure.

FIG. 15 is a block diagram illustrating a computing system that executes the method for generating a disparity map according to an exemplary embodiment of the present disclosure.

Referring to FIG. 15, a computing system 1000 may include at least one processor 1100, a memory 1300, a user interface input device 1400, a user interface output device 1500, a storage 1600, and a network interface 1700 which are connected through a bus 1200.

The processor 1100 may be a central processing unit (CPU) or a semiconductor device executing processes for instructions which are stored in the memory 1300 and/or the storage 1600. The memory 1300 and the storage 1600 may include various kinds of volatile or non-volatile storing media. For example, the memory 1300 may include a read only memory (ROM) and a random access memory (RAM).

Accordingly, operations in the method or algorithm which is described in connection with the exemplary embodiments disclosed in the present specification may be directly implemented in hardware, a software module, or a combination thereof which is executed by the processor 1100. The software module may be resided on a storing medium (i.e., the memory 1300 and/or the storage 1600) such as a random access memory (RAM) memory, a flash memory, a read only memory (ROM) memory, an erasable programmable read only memory (EPROM) memory, an electrically erasable programmable read only memory (EEPROM) memory, a register, a hard disk, a removable disk, or a compact disc-read only memory (CD-ROM). An illustrative storing medium may be coupled to the processor 1100 and the processor 1100 may read information from the storing medium and write the information into the storing medium. Alternatively, the storing medium may also be integral with the processor 1100. The processor and the storing medium may also be resided within an application specific integrated circuit (ASIC). The ASIC may also be resided within a user terminal. Alternatively, the processor and the storing medium may also be resided within the user terminal as an individual component In the system and method for generating a disparity map as described above, the configuration and the method of the above-mentioned exemplary embodiments are not restrictively applied. That is, all or some of the respective exemplary embodiments may be configured to be selectively combined with each other so that they may be variously modified.

As described above, according to the exemplary embodiments of the present disclosure, it is possible to provide the method for generating a disparity map capable of excellently performing the matching of the stereo images even in bad weather conditions.

Meanwhile, effects which may be obtained from the present disclosure are not limited to the above-mentioned effects. That is, other effects that are not mentioned may be obviously understood by those skilled in the aft to which the present disclosure pertains from the following description.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for generating a disparity map, the system comprising:
    an image obtainer obtaining a left image and a right image;
    a matching cost calculator calculating a matching cost for each of a plurality of pixels of the left image and the right image;
    an accumulation and summation calculator calculating an accumulation value of one of the pixels based on the calculated matching cost, and calculating a relaxation accumulation value, which is an average of values obtained by multiplying each of relation coefficients between a disparity value of the one pixel and disparity values of surrounding pixels of the one pixel with the accumulation value of the one pixel;
    a disparity value deriver deriving a disparity value for each of the pixels based on the calculated relaxation accumulation value; and
    a disparity map generator generating the disparity map based on the derived disparity value.

2. The system according to claim 1, wherein the matching cost calculator calculates the matching cost by comparing ground images of the left image and the right image, and calculates the matching cost by comparing images over a ground of the left image and the right image.

3. The system according to claim 1, wherein when the accumulation and summation calculator accumulates and sums the matching cost in a vertical direction, the accumulation and summation calculator calculates a current accumulation value by summing a minimum value among an accumulation value of a previous direction of the corresponding disparity, a value obtained by summing a first accumulation constant to an accumulation value of a direction around a disparity value, and a value obtained by summing a second accumulation constant to a minimum value of the accumulation values of the previous direction to current matching cost, and when the accumulation and summation calculator accumulates and sums the matching cost in a horizontal direction, the accumulation and summation calculator calculates the current accumulation value by summing a minimum value among the accumulation value of the previous direction of the corresponding disparity and the value obtained by summing the second accumulation constant to the minimum value of the accumulation values of the previous direction to the current matching cost.

4. The system according to claim 1, wherein the accumulation and summation calculator calculates a repeated relaxation accumulation value, which is an average of values obtained by multiplying each of the relation coefficients between the disparity value of the one pixel and the disparity values of the surrounding pixels of the one pixel with the relaxation accumulation value of the one pixel, and
    the disparity value deriver derives the disparity value for each of the pixels based on the repeated relaxation accumulation value.

5. The system according to claim 1, wherein the disparity value deliver derives a disparity value that the calculated accumulation value becomes a minimum, as the disparity value of the one pixel.

6. The system according to claim 1, further comprising a stixel applier grouping pixels having the same disparity value in a vertical direction or a horizontal direction to configure a stixel, and changing disparity values of pixels located between a plurality of stixels to disparity values of the plurality of stixels when a pixel distance between the plurality of stixels which are configured in the same direction to be located on the same line and have the same disparity value is a preset pixel value or less.

7. A method for generating a disparity map, the method comprising:
    obtaining, by an image obtainer, a left image and a right image;
    calculating, by a matching cost calculator, a matching cost for each of a plurality of pixels of the left image and the right image;
    calculating, by an accumulation and summation calculator, an accumulation value of one of the pixels based on the calculated matching cost;
    calculating, by the accumulation and summation calculator, a relaxation accumulation value, which is an average of values obtained by multiplying each of relation coefficients between a disparity value of the one pixel and disparity values of surrounding pixels of the one pixel with the accumulation value of the one pixel;
    deriving, by a disparity value deriver, a disparity value for each of pixels based on the calculated relaxation accumulation value; and
    generating, by a disparity map generator, the disparity map based on the derived disparity value.

8. The method according to claim 7, wherein in the calculating of the matching cost, the matching cost is calculated by comparing ground images of the left image and the right image, and the matching cost is calculated by comparing images over a ground of the left image and the right image.

9. The method according to claim 7, wherein in the calculating of the accumulation value, when the matching cost is accumulated and summed in a vertical direction, a current accumulation value is calculated by summing a minimum value among an accumulation value of a previous direction of the corresponding disparity, a value obtained by summing a lust accumulation constant to an accumulation value of a direction around a disparity value, and a value obtained by summing a second accumulation constant to a minimum value of the accumulation values of the previous direction to current matching cost, and when the matching cost is accumulated and summed in a horizontal direction, the current accumulation value is calculated by summing a minimum value among the accumulation value of the previous direction of the corresponding disparity and the value obtained by summing the second accumulation constant to the minimum value of the accumulation values of the previous direction to the current matching cost.

10. The method according to claim 7, further comprising: after the calculating of the relaxation accumulation value, calculating a repeated relaxation accumulation value, which is an average of values obtained by multiplying each of the relation coefficients between the disparity value of the one pixel and the disparity values of the surrounding pixels of the one pixel with the relaxation accumulation value of the one pixel, wherein in the deriving of the disparity value for each of the pixels, the disparity value for each of the pixels is derived based on the repeated relaxation accumulation value.

11. The method according to claim 7, wherein in the deriving of the disparity value for each of the pixels, a disparity value that the calculated accumulation value becomes a minimum is derived as the disparity value of the one pixel.

12. The method according to claim 7, further comprising: grouping pixels having the same disparity value in a vertical direction or a horizontal direction to configure a stixel, and changing disparity values of pixels located between a plurality of stixels to disparity values of the plurality of stixels when a pixel distance between the plurality of stixels which are configured in the same direction to be located on the same line and have the same disparity value is a preset pixel value or less.

13. A non-transitory computer readable medium containing program instructions executed by a processor, the computer readable medium comprising:

program instructions that obtain a left image and a right image;

program instructions that calculate a matching cost for each of a plurality of pixels of the left image and the right image;

program instructions that calculate an accumulation value of one of the pixels based on the calculated matching cost;

program instructions that calculate a relaxation accumulation value, which is an average of values obtained by multiplying each of relation coefficients between a disparity value of the one pixel and disparity values of surrounding pixels of the one pixel with the accumulation value of the one pixel;

program instructions that derive a disparity value for each of pixels based on the calculated relaxation accumulation value; and program instructions that generate a disparity map based on the derived disparity value.

* * * * *